United States Patent
Price

(10) Patent No.: US 6,643,978 B2
(45) Date of Patent: Nov. 11, 2003

(54) COLLAPSIBLE WATER RESERVOIR POT

(76) Inventor: Timothy Key Price, 239 Indian Acres Rd., Fairlee, VT (US) 05045

( * ) Notice: Subject to any disclaimer, the term of this patent is extended or adjusted under 35 U.S.C. 154(b) by 67 days.

(21) Appl. No.: 10/086,120

(22) Filed: Feb. 26, 2002

(65) Prior Publication Data

US 2003/0159352 A1 Aug. 28, 2003

(51) Int. Cl.⁷ .................................................. A01G 9/02
(52) U.S. Cl. ........................................................ 47/65.8
(58) Field of Search ............................. 47/67, 73, 65.7, 47/65.8, 65.5, 81

(56) References Cited

U.S. PATENT DOCUMENTS

| | | | |
|---|---|---|---|
| 540,681 A | 6/1895 | Myers | |
| 1,994,962 A | 3/1935 | Rushfeldt | |
| 2,039,986 A | 5/1936 | Gardner | |
| 2,881,939 A | 4/1959 | Nelson | |
| 3,818,633 A | 6/1974 | Sable | |
| 4,149,339 A | 4/1979 | Hall et al. | |
| 4,216,623 A | 8/1980 | Silver | |
| 4,270,696 A | * 6/1981 | Pointer, Jr. | 239/38 |
| 4,744,171 A | * 5/1988 | Hilliard | 47/67 |
| 4,750,292 A | 6/1988 | Alstig | |
| 4,771,573 A | 9/1988 | Stengel | |
| 4,914,860 A | 4/1990 | Richardson | |
| 5,018,300 A | * 5/1991 | Chiu et al. | 47/67 |
| 5,070,645 A | 12/1991 | Vaughn | |
| 5,127,187 A | 7/1992 | Hattori et al. | |
| 5,167,092 A | 12/1992 | Reiger | |
| 5,171,390 A | * 12/1992 | Travers | 156/212 |
| 5,303,506 A | 4/1994 | Weder et al. | |
| 5,311,700 A | 5/1994 | Thomas | |
| 5,454,191 A | 10/1995 | Mayeda et al. | |

(List continued on next page.)

FOREIGN PATENT DOCUMENTS

| | | | |
|---|---|---|---|
| GB | 2147484 A | * | 5/1985 |
| GB | 2288307 A | * | 10/1995 |
| GB | 2317095 A | * | 3/1998 |
| JP | 2000-184822 | * | 7/2000 |
| JP | 2001-137096 | * | 5/2001 |
| JP | 2002-95357 | * | 4/2002 |

Primary Examiner—Peter M. Poon
Assistant Examiner—Jeffrey L. Gellner

(57) ABSTRACT

The Plantwear™ fabric pot consists of a shell (12), an inner membrane (14), and a mesh liner (16). These are attached to a ring-band (22) which also encloses a compression-ring (20). These are supported by braided ropes (26) which are attached to the compression-ring in 3 places where the sections of the ring-band (22) expose the compression-ring (20). The ropes are collected at a center-knot (28) and form a tie-loop (30), and a tie (34) which has a tie-knot (32) near its end. The tie (34) can be passed over a support, such as a rod or hook, and the tie-knot (32) passed through the tie-loop to securely hold the Plantwear™ fabric pot to the support. A wick (41) is placed through the liner (16) via a grommet (42) and into a chamber area (18) to help transfer, through capillary action, any water which might have drained into and remain in the chamber, back up into the root-pouch (36). The fabric pot is packaged folded flat in an envelope. Remove the pot from the envelope in which it is packaged and then hold it up by the ties (26) and shake it to expand it for use. FIG. 2 The root-pouch (36) is to be filled with a potting medium and a plant or seed (40) is to be placed within the medium. The drawstring (38) is then pulled in order to snug the upper portion of the root-pouch around the medium and secure it in place as well as provide a barrier to insects which would otherwise take up residency within the plant's roots and the growing medium. The upper margins of this closure can be arranged around the stem of a plant for a more complete barrier. FIG. 3 The root-pouch (36), with its media and plant (FIG. 2.), is set inside the Plantwear™ pot, watered, and finally placed in a suitable growing environment, either inside or out.

2 Claims, 3 Drawing Sheets

U.S. PATENT DOCUMENTS

Figure 7:
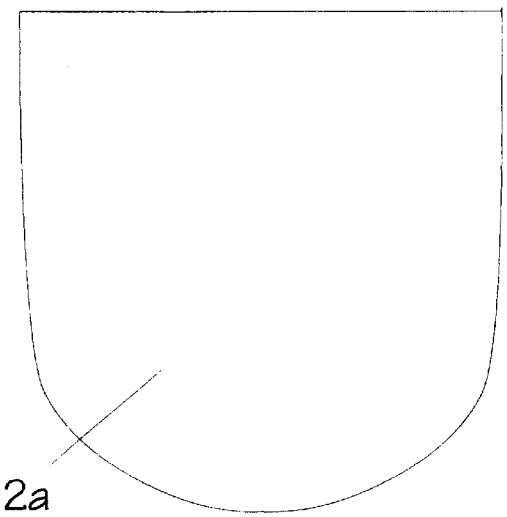

| | | | |
|---|---|---|---|
| 5,706,604 A | * 1/1998 | Yogi | .................. 220/495.11 |
| 5,715,629 A | 2/1998 | Hawkins | |
| 5,829,193 A | 11/1998 | Otake | |
| 6,041,546 A | 3/2000 | Baranova | |
| 6,058,651 A | 5/2000 | Perez | |
| 6,073,393 A | 6/2000 | Gutsche | |

* cited by examiner

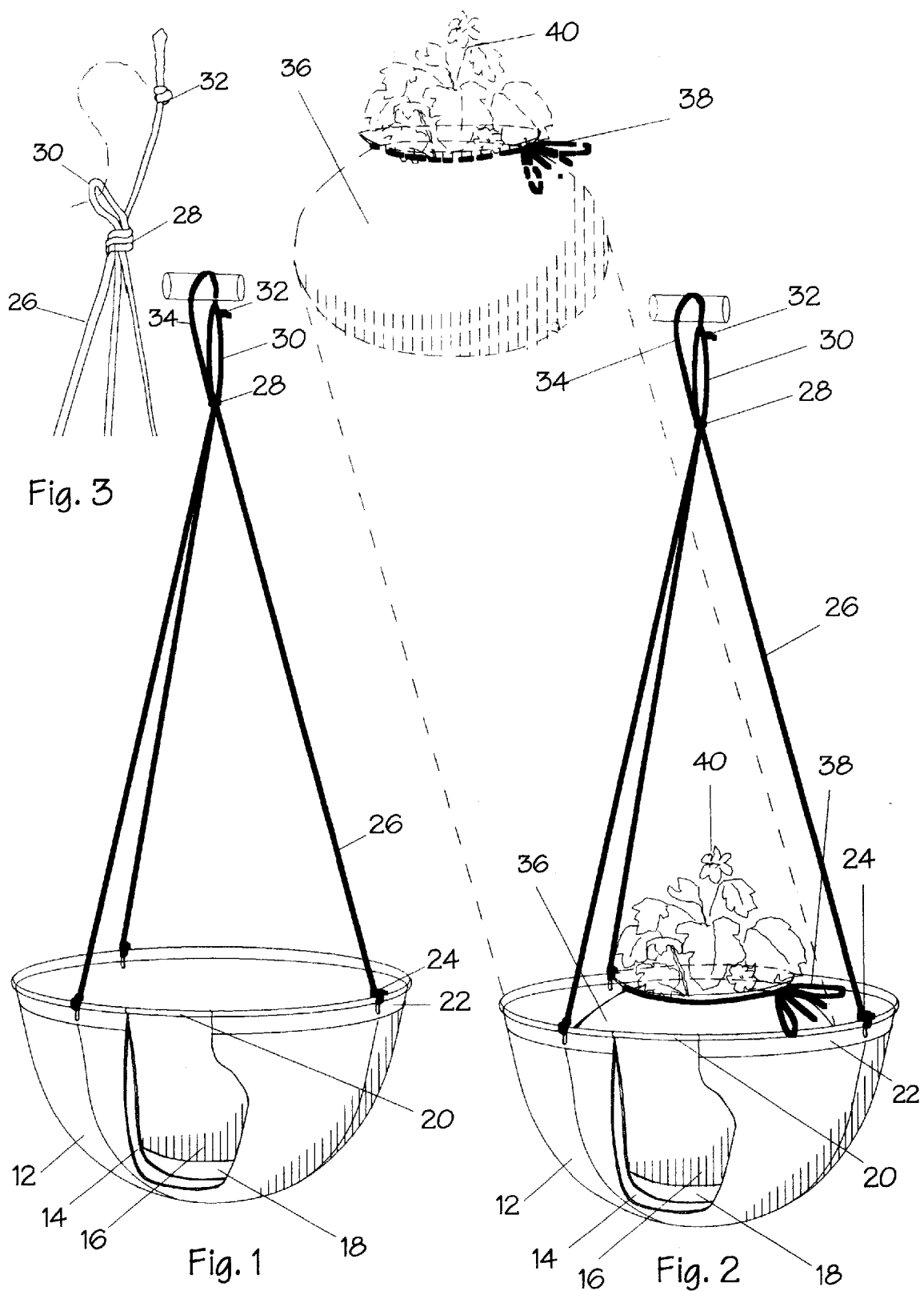

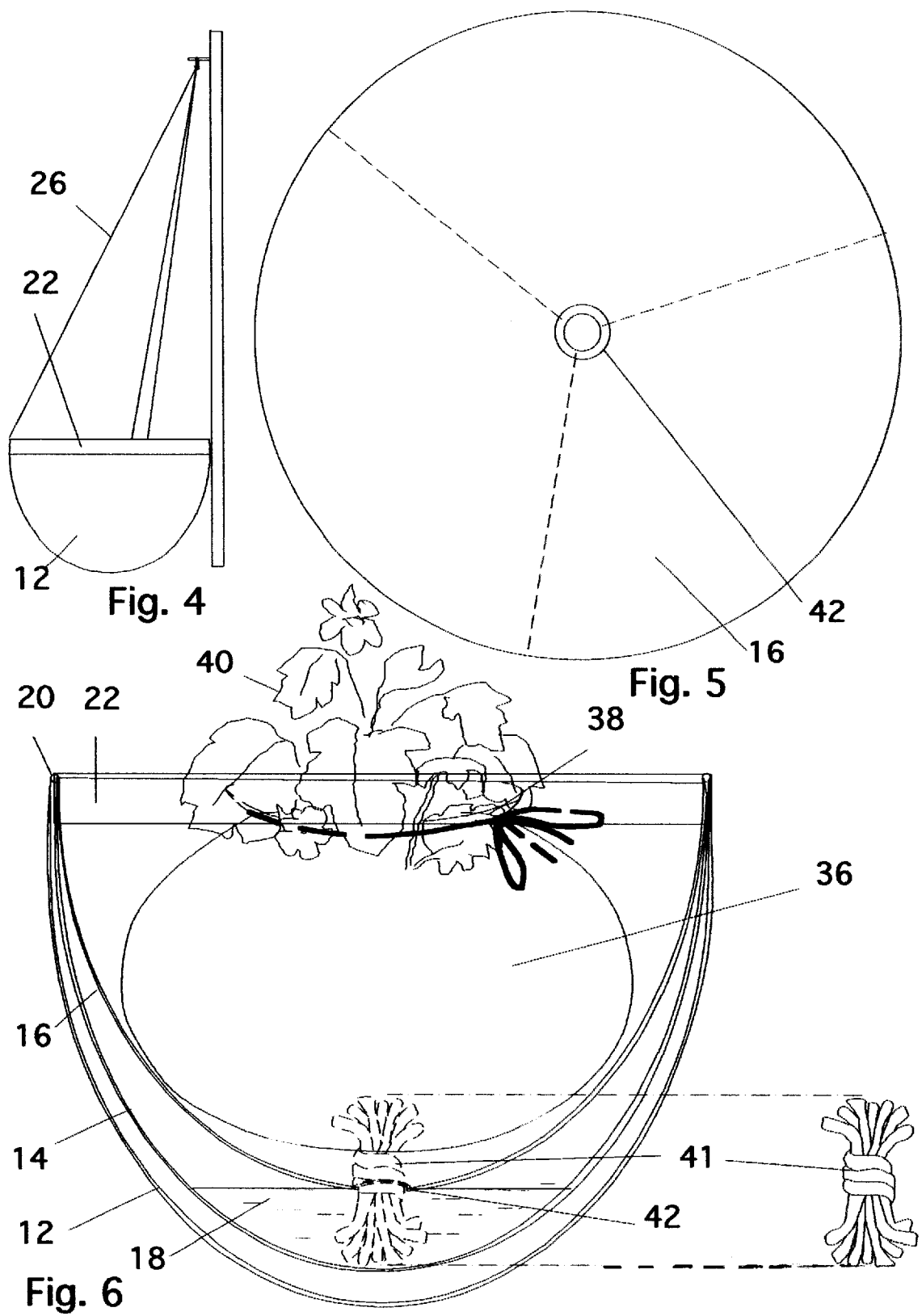

12a

26a

16a

14

22a

COLLAPSIBLE WATER RESERVOIR POT

FEDERALLY SPONSORED RESEARCH

Not Applicable

SEQUENCE LISTING OR PROGRAM

Not Applicable

BACKGROUND—FIELD OF INVENTION

This invention relates to flower pots, specifically to improvements in the physical structure used for cultivating plants, reducing the bulk and weight of the pot and thereby increasing the market for it, and increases both the useful lifespan and aesthetic appeal of the pot.

BACKGROUND—DESCRIPTION OF PRIOR ART

Pots which are used to grow plants have traditionally been made of hard materials such as terra cotta clay, wood, or plastic. The art of designing pots is very old and has evolved to provide for containing the plant and its necessary growing medium. But the requirements of the plant also require the pot to provide drainage of excess water, possibly even having a reservoir for that water so that it can be retained and used as needed by the plant (not lost to the floor or ground) and finally, a means of anchoring a hanging pot to a support.

The approach to providing a pot for the plant and its growing medium has been to simply place them into a container which has a hole for drainage. But, it has been shown that there is a significant improvement in first placing the medium and root system into a flexible porous bag, such as the balled-in burlap technique used in nursery stock where plants must be moved occasionally for transplanting.

U.S. Pat. No. 540,681 (1895) to Myers for a Plant-Holder, uses an earth holding basket to retain the earth and plant so that the plant may be removed without disturbing its roots. Here the bag is used only during the initial period of nursery growth and transport, not as a permanent container for the plant.

U.S. Pat. No. 51 67092 (1992) to Reiger for Method and Fabric Container for Controlling Root Growth describes a "balled-in-burlap" type of nursery container which limits root growth with a needle punch poly fabric, prior to removal from the ground for transplanting. Here the function is to limit root growth to inside the ball and to provide support for the roots when the plant is transported. It is not suggested for a permanent container or pot, though it is suggested that it may be left on when the plant is transplanted without damaging the plant.

U.S. Pat. No. 5,311,700 (1991) to Thomas for a Container for Plants describes another "balled-in-burlap" type polyurethane liner supported within a wire mesh outer basket for transplanting. It may also be left on at planting without harm to the plant.

U.S. Pat. No. 1,994,962 (1935) to Rushfeldt and Lea, Plant Package and Method of Making the Same, describes an elastic envelope surrounding a root ball. The envelope is made of rubber sheeting and is used to contain a moisture absorbing material. Its purpose is to protect plants in shipment by excluding insects and retaining moisture with a rubber membrane. Here the two functions of containment and the conservation of moisture have been achieved, but as a packing device for shipping plants, and not in application to a permanent planting location, and it does not promote the free exchange of atmospheric gasses to the root system and biologically active planting medium necessary for long term containment.

U.S. Pat. No. 2,039,986 (1936) to Gardner for a Watering Tube Device simply describes a method for watering packed plants by injecting water into the rootball without wetting the packaging. It suggests the plant would be balled-in-burlap and wrapped in a waterproof material for shipping. Again, this is in application of packaging plants for transportation and transplanting, not in regard to a permanent planter or pot. This is an attempt to remedy the difficulties the previously sited patent addresses, that being, a tightly held growing medium surrounded by a moisture proof outer layer is not a good idea.

U.S. Pat. No. 2,881,939 (1956) to Nelson for a Planter, describes a wooden pot of slats held together with a barrel-hoop type band from which it can be supported. Here we have the container furnished by a hard wooden device and a barrel hoop to hold it together. This results in a large, thick, heavy object which is difficult to store in that it takes up much space, is therefore expensive to ship or mail, and is sometimes damaging to anything which might be hit by it, be it another plant and pot, a wall surface, or someone's head.

U.S. Pat. No. 4,149,339 (1976) to Hall et al. to Hall and Richards for Hanging Plant Holder to Hang from a Curtain Rod describes a water packet of flexible waterproof material with a water reservoir below and a wick to bring water to the plant roots. The method of production and choice of material produces an article which has limited the shape to a tall and wide container with little front to back depth and thereby provides limited root growth space as well as it utilizes only the waterproof material separated into two spaces; there is no inner liner separating the growing medium from the moisture proof outer layer for exchange of atmospheric gasses, nor is it fully circular pot and a separate support structures via a bag for holding the planting medium and roots.

U.S. Pat. No. 3,818,633 (1971) to Sable for Device and a Method of Watering and Feeding Plants describes using a flexible rubber membrane to hang around the sides and bottom of a fibrous pot to retain water. It is to be applied to existing pots as a separate element.

U.S. Pat. No. 4,750,292 ((1987) to Alstig for a Plant Guard describes a knitted fabric hose like net to form a casing around the entire plant for the purpose of excluding insects. Then the Chinese have been using nets around fruit on trees for centuries to exclude insects from damaging the fruit.

U.S. Pat. No. 4,771,573 (1986) to Stengel for a Raincoat for Hanging Plants describes a decorative cover for a flower pot to contain the water in an absorbent liner with a wick. This cover is to be applied over existing pots, particularly hanging pots and suggests being packaged in a kit form. This is not a feature of the pot itself, but an addition to the pot.

U.S. Pat. No. 4,914,860 (1988) to Richardson for a Flower Pot Cover describes a decorative cover for a flower pot consisting of an inner liner which is waterproof and an outer cover in the design of an animal. The purpose here is to use fabric to alter the appearance of a hard container being used as a pot so as to contain excess water and to look like a stuffed toy. The results are novel, or create a novelty.

U.S. Pat. No. 5,070,645 (1991) to Vaughn for a Flower Pot Container describes a rigid water resistant liner covered in a decorative fabric. It appears much like a padded hexagonal wastebasket. It is not advantageous in encouraging healthy plant growth nor does it have other utilitarian functions.

U.S. Pat. No. 5,303,506 (1994) to Weder et al. for a Basket Flower Pot with a Decorative Cover describes a flat polymer film sheet or paper sheet pulled up into decorative cover which is to be applied to the underside of an existing hanging pot. Again, the purpose is to address the shortcoming of the pots which have insufficient storage capacity for water, i.e. they have no reservoir.

U.S. Pat. No. 5,454,191 (1994) to Mayeda et al. for a Flexible Hanging Basket Liner and describes a liner for a wire basket to help contain excess water and to help moss covered wire basket planters from drying out, as well as to be "decorative".

U.S. Pat. No. 5,127,187 (1992) to Hattori et al for a Soil or Soil Improver Containing Porous Ion Exchanger and describes a soil-like medium contained within a plastic bag to allow a plant to grow without watering or feeding for as long as a year. It uses special growing media for ion exchange so that the plant can remain healthy in a closed plastic bag without attention for as long as a year.

This particular medium may just as well be used to advantage in any container and does not directly affect its configuration. The medium, in this application, is the novelty which allows the use of a plastic bag container. The unique medium is necessary here, as it minimizes the requirements of the container.

U.S. Pat. No. 5,715,629 (1998) by Hawkins for a Plant Cultivation Apparatus describing a bag structure with openings along the walls for plants to grow through. It uses an inner mesh liner for the medium, another layer of plastic for water retention, an outer layer of fabric for appearance, and all to be set in a water retentive dish. The purpose of the invention is to allow for the growth of plants outside of a vertical column, while drawing water up from a dish the column rests upon. It attempts to supply the requirements of the plant and its soil environment but does so in a rigid container with separate saucer and planting only on its exterior.

U.S. Pat. No. 5,829,193 (1998) to Otake et al. for a Moquette for a Horticultural Hanging Pot describes a layered sandwich liner of plastics and super absorbent polymer powder which can be placed inside a pot to increase the water retention and lengthen periods between watering. Again, an attempt to improve the performance of the tradition pot through the use of new potting media sandwich inside a lining material. This is not a complete pot in itself.

U.S. Pat. No. 6,041,546 (2000) to Baranova for a Planter Pouch describes a bag-shaped plastic bladder and containing a polymeric growth medium. Plants are inserted through slits into the outer covering. It produces a column of plants on the outside of the bag. The configuration is not satisfactory for more traditional planting.

U.S. Pat. No. 4,216,623 (1978) to Silver for Plant Watering System and Process describes an inner porous clay pot at an elevated position within a water-impervious outer container. Water is wicked to the plant through the walls of the porous inner clay pot. Even though these functions are provided for, all of these are composed of rigid, traditionally used materials, and having the qualities of great weight, taking up too much space in storage, and causing damage to itself, the plant, and to adjacent surfaces if it collides with them.

U.S. Pat. No. 6,058,651 (1995) to Perez for Hanging Plant Apparatus describes a conical mesh sleeve with a rigid ring in the upper margin and suspended while holding a conventional pot at the base of the cone, held with a drawstring. When filled with growing medium, plants can be inserted into the cone through holes made into the sides of the cone shaped fabric. Here a fabric cone is formed above the traditional pot to hold the planting medium; the plants are to grow outside the structure. This does not lend itself to the traditional form of plant growth; i.e. a specimen plant within and above a container.

U.S. Pat. No. 6,073,393 (2000) to Gutsche for Elements for a Plant Container describes a semitransparent waterproof outer material to be applied over an existing hanging pot. The purpose is for monitoring and controlling the amount of water contained within it, to control spills, and also to provide an attractive cover for pots. The attempt here is to correct the problems of spilling because of pots having no reservoir, and provides a "decorative cover".

None of these solutions provides a complete growing system within a structure which embodies all of the functions which should be performed by a pot and its media for healthy plant growth and ease of care, while also being lightweight, soft, and the size and shape of the traditional flower pot.

1. Short Lifespan. Most hanging pots are considered to be disposable. Plastic and clay pots do not last very long in use because they break so easily.

2. Poor water retention. Available hanging pots do not hold much water and often drain out onto the floor, and there may not be a reservoir from which the plant to can draw water.

3. Bent and rusty wires. The wires which are used to hang pots break loose easily. They become bent and tangle when stored, are difficult to remove, rust, and otherwise often may not look very good or last very long.

4. Few color choices. Available pots are not sold in colors other than green, white, or terra cotta.

5. Cumbersome. Commercially available pots take up much room and do not store well, having their stiff wire hangers and saucers attached so they cannot nest inside each other. Removing the saucers and wires is time consuming and often breaks the pot.

6. Fragile and hazardous. Hanging pots are hard objects and easy to bump accidentally. A hard pot is easily broken by hitting other pots or walls and must be handled with care at all times as when watering or filling, being transported, or stored.

7. Large and bulky. Commercially available pots cannot be stored is a small enough space to make them available in retail card shops, florist shops, or other gift oriented stores, other than garden shops and nurseries. A pot could become a traditional gift item, like a balloon, or a card, or flowers.

8. Special handling required. No commercially available pots can be mailed in an envelope inexpensively because of their weight and size, and inflexibility.

9. There is not presently available the combination of features desired in pots which are addressed in this invention, either in their materials or design features, which can provide the exceptionally fine growing environment for plants, and at the same time, protects from water spills, be available in many colors and textures, be light enough to mail or ship easily, and be durable.

OBJECTS AND ADVANTAGES

1. Provide a container for plants which utilize the best techniques in plant care, and possessing a. A large circular opening at top b. Ample soil capacity c. Thorough drainage d. A water reservoir and a wick providing for both water retention and reabsorption d. A separate root/media container, or root-pouch, for ease of repotting.

e. An insect barrier to reduce infestations.

f. plant friendly permeability.

g. softness for plant compatibility.

2. Provide durability, made of quality materials that do not easily corrode, break, or rot.

7. Reduce overflow when watering to protect the floors or furnishings.

3. Provide a soft structure to accomplish the above functions so that they can be compressed easily for storage, is soft enough to allow collision without injury to plant, pot, wall, or body. For greenhouse production they should be able to be dropped into water to soak without worry about breaking either the pot or the container of water.

4. Provide colorful pots, from bright accent colors to greens and earth tones, to wall colors, so that the pot may be seen as an article of expression, like a pennant, banner, or flag.

5. Lightweight so they can be inexpensively mailed, or otherwise shipped.

6. Collapsible, able to be extremely thin and flexible so that they can be stored and packaged in a small enough space to allow them to be sold, not only in garden shops and nurseries, but in card shops, florist shops, or other gift oriented stores as well, so that fabric pots might become a useful alternative to such traditional gift items as banners, greeting cards, candy, flowers, and the like.

SUMMARY

In accordance with the present invention a COLLAPSIBLE WATER RESERVOIR POT is a state of the art container for growing plants which is soft, lightweight, durable, easy to care for, available in many colors, is collapsible and thus allows it to be packaged for sale in flat envelopes.

I first began making fabric pots in 1975 for my own use and have continued to development them to the present. My first pot is still in service, holding a bonsai Surinam Cherry tree.

DRAWINGS

Drawing figures

The drawings show the invention called, a Plantwear™ Fabric Pot.

FIG. 1. Fabric pot without a root-pouch showing three layers of fabric for the container, a compression-ring, and support ties and their configuration.

FIG. 2. Fabric pot with a root-pouch and drawstring outside the container, and also placed within the pot as it is to be used.

FIG. 3. Ties with the details of what they are, how they are assembled, and their use.

FIG. 4. Alternate hanging position of the fabric pot.

FIG. 5. Mesh-liner showing the Grommet for the Wick inside the pot.

FIG. 6. Cross section showing a root-pouch with a Wick in the fabric pot.

FIG. 7. One pattern of 3 pieces for a Shell assembly

Figure 8:
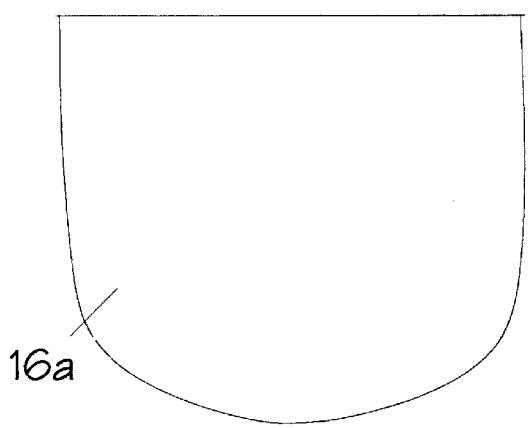

FIG. 8. One pattern of 3 pieces for a mesh-liner

Figure 9:
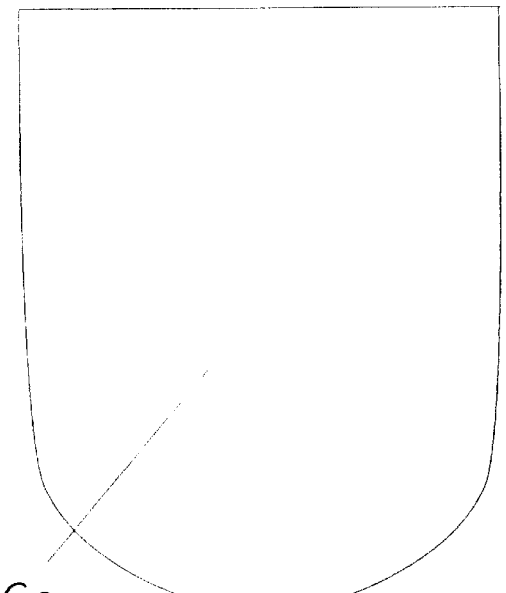

FIG. 9. One pattern of 3 pieces for a root-pouch

Figure 10:
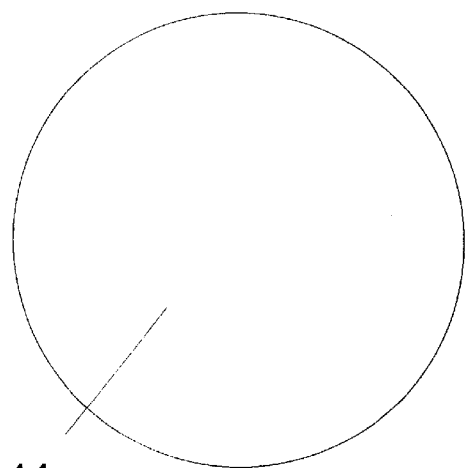

FIG. 10. One pattern for an inner-membrane

Figure 11:
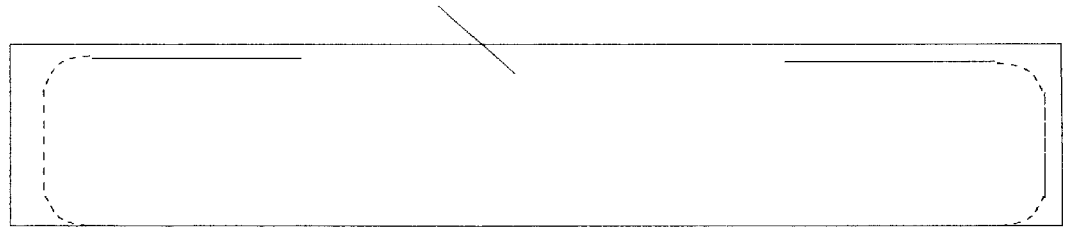

FIG. 11 One pattern of 3 pieces for a ring-band.

REFERENCE NUMERALS IN DRAWINGS 12. shell
14. inner membrane
16. mesh-liner
42. grommet for wick
18. water-chamber
20. compression-ring
22. ring-band
24. adjustable-fastener
26. tie-lines
28. center-knot
30. tie-loop
32. tie-knot
34. tie
36. root-pouch
38. drawstring
40. plant
41. wick

DETAILED DESCRIPTION

Description—FIGS. 1 and 2—Preferred Embodiment

Description FIGS. 1, 2, 3, 4, 5.

A preferred embodiment of the Plantwear™ fabric pot is illustrated in

FIG. 1 (with root-pouch removed) and FIG. 2 showing the root-pouch out of the pot and with it in position within the pot as it is intended to be used. A Shell 12 is made of lightweight polyester fabric or other fabric which is thin, strong, and durable, being resistant to weathering, UV, and bacteria, and is porous. It may be of any color, texture, and even other material to best suit a particular application. An Inner Membrane 14 is made from a very thin, lightweight silicone encapsulated polyester or other waterproof membrane. A mesh-liner 16 is made from a polyester or other material in a very fine mess fabric, 180 micron opening or less, which supports the root-pouch 36 and is also durable, being weather resistant, UV resistant, and does not contribute to the growth of bacteria. FIG. 5. Centered within the mesh-liner is a Grommet 42 with its opening for a wick 41.

FIGS. 1 & 2. A rigid compression-ring 20 is held horizontally by the tie-lines 26 and forms the support for the combined shell, inner membrane, and mesh liner, which are fastened to a ring-band 22. The ring-band with the elements 12, 14, and 16 attached to it, is made from 3 pieces 22a, FIG. 11. and is folded to form a pocket for the compression-ring 22 to fit inside, and leaves spaces between the ring-band segments for the attachment of tie-lines 26 to the compression-ring.

An adjustable-knot 24 attaches a tie-line 26 to the compression-ring. The tie-lines are soft, flexible polyester cords or other material which is UV resistant so that it will not soon rot or rust. FIG. 3. A center-knot 28 joins together the tie-lines from which emerge a tie 34 and a tie-loop 30. The tie-Loop 30 forms the locking mechanism through which the Tie 34 and tie-knot 32 pass to secure the fabric pot from a suitable perch. FIG. 4. Alternative hanging position, against wall or post.

FIG. 6. A root-pouch 36 forms the container for a potting medium and a plant. A drawcord 28 gathers the root-pouch 36 together around the potting medium and plant. A Wick 41 passes through the mesh-liner 16 from the water chamber 18 to the root-pouch 36.

Advantages (a) Provides a container for plants which utilize the best techniques in plant care including 1. a large round opening at top.
2. ample soil capacity.
3. permeability for thorough drainage.
4. a water reservoir and a wick providing for both water retention and reabsorption.
5. a separate root/media container, or root-pouch, for ease of repotting.
6. a root-pouch for transporting the plant and to filter out Insects.
7. a mesh liner which supports the root-pouch and plant to breathe the moist air within a water-chamber.
8. Softness to provide a more plant friendly environment.
2. Provide durability, made of quality materials that do not easily corrode, break, or rot.
7. Control overflow when watering to protect the floors or furnishings and to conserve the water.
3. Provide a soft structure to accomplish the above functions; and also, that they can be compressed easily for storage, is soft enough to allow collision without injury to plant, pot, wall, or body. For greenhouse production they should be able to be dropped into water to soak without worry about breaking either the pot or the container of water.
4. Provide colorful pots, from bright accent colors to greens and earth tones, to wall colors, so that the pot may be seen as an article of expression, like a pennant, banner, or flag.
5. Lightweight so they can be inexpensively mailed, or otherwise shipped.
6. Collapsible, able to be extremely thin and flexible so that they can be stored and packaged in a small enough space to allow them to be sold, not only in garden shops and nurseries, but in card shops, florist shops, or other gift oriented stores as well, so that fabric pots might become a useful alternative to such traditional gift items as banners, greeting cards, candy, flowers, and the like.

Operation of Invention

The Plantwear™ fabric pot is packaged compressed flat in an envelope. The pot is then to be removed from the envelope in which it is packaged and held up by ties (26) and shaken to expand it for use. FIG. 1. The fabric pot consists of a shell (12), an inner membrane (14), and a mesh liner (16). These are attached to a ring-band (22) which also encloses a compression-ring (20). These are supported by braided ropes (26) which are attached to the compression ring in 3 places where the 3 sections of the ring-band (22) leave exposed areas of the compression ring (20). The ropes are collected at a center-knot (28) and form a tie-loop (30), and a tie (34) which has a tie-knot (32) near its end. The tie (34) can be passed over a support, such as a rod or hook, and the tie-knot (32) passed through the tie-loop to securely hold the Plantwear™ fabric pot to the support. A wick (41) is placed through the liner (16) and into a chamber area (18) to help transfer, through capillary action, any water which might have drained into and remain in the chamber, back up into the root-pouch (36).

FIG. 2 The root-pouch (36) is to be filled with a potting medium and a plant or seed (40) is to be placed within the medium. The drawstring (38) is then pulled in order to snug the upper portion of the root-pouch around the medium and secure it in place as well as provide a barrier to insects which would otherwise take up residency within the plant's roots and the growing medium. The surplus in the upper margins of this closure can be arranged around the stems of a plant for a more complete barrier.

FIG. 3 The root-pouch (36), with its media and plant (FIG. 2.), is set inside the fabric pot, watered, and finally placed in a suitable growing environment, either inside or out. The fabric pot provides an environment in which a plant can thrive. It is soft and is available in many colors. It is also lightweight and collapsible for shipping or storage; it is washable and durable. Just add potting soil and a plant or seeds to the root-pouch, put the root-pouch and plant into the fabric pot, water it and hang it in a suitable location. Any plant will still require attention, but the Plantwear™ Fabric Pot encourages the conditions which are excellent for healthy plant growth.

Conclusion, Ramifications, and Scope

The soft quality of this fabric pot offers many advantages.

(a) The open fabric which surrounds the plant and media creates a more natural environment for plants. i.e. greater access to air circulation, water vapor condensation evaporation.
(b) They are easier on plants also, due to their soft nature which is itself more compatible with the soft tissue of plants. They will not easily crush or bruise a plant, or people.
(c) Fabric pots are not fragile and will not crack or break with years with reasonable use.
(d) Fabric pots will not scratch or mare table tops, wall surfaces, or foreheads.
(e) They are easy to carry in great numbers and can be piled together when packed and then easily unpacked without worry of damage.
(f) They are easier for people to work with because they are soft to the touch.
(g) They can be strikingly colorful and can create a contrast with the plant, or match its blooms, or match the decor of the venue in which they are used. They can be made to blend in with the background or foliage and nearly disappear.
(h) They are easier on plants also, due to their soft nature which is itself more compatible with the soft tissue of plants. They will not easily crush or bruise a plant, or people.
(i) Because of their exceptionally good performance and their ability to be compressed into smaller space, these pots may be marketed more widely than pots which use other materials. They may be more successful in the market place because of their convenience, appearance, lightness, and durability. They can be used in either wholesale commercial production greenhouses, or as a design feature at large receptions, or retailed in nurseries, or as a more useful everyday gift item, like a banner, balloon, greeting card, or flowers.

I claim:

1. A collapsible water reservoir pot for growing plants comprising:

a soft, durable, fabric inner container for holding potting media;

a permeable mesh liner made of fabric surrounding the inner container;

a waterproof fabric layer surrounding the mesh liner;

a fabric outer shell; wherein, the mesh liner, fabric layer, and fabric outer shell are fastened together with a ring band enclosing a rigid internal support; and, a wick extending from the fabric inner container to a chamber formed between the mesh liner and the waterproof fabric layer, the chamber capable of holding water.

2. The collapsible water reservoir pot of claim 1, further comprising a tie system with at least three tie lines, the system for suspending the pot from an external support.

* * * * *